United States Patent
Ansari

(10) Patent No.: US 9,221,136 B2
(45) Date of Patent: Dec. 29, 2015

(54) TRANSPORTABLE HYBRID POWER SYSTEM

(71) Applicant: Reza Ansari, Lake Quivira, KS (US)

(72) Inventor: Reza Ansari, Lake Quivira, KS (US)

( * ) Notice: Subject to any disclaimer, the term of this patent is extended or adjusted under 35 U.S.C. 154(b) by 242 days.

(21) Appl. No.: 13/769,113

(22) Filed: Feb. 15, 2013

(65) Prior Publication Data

US 2014/0231284 A1 Aug. 21, 2014

Related U.S. Application Data

(60) Provisional application No. 61/600,094, filed on Feb. 17, 2012.

(51) Int. Cl.
| | |
|---|---|
| *B60K 16/00* | (2006.01) |
| *F01B 21/04* | (2006.01) |
| *E04B 2/56* | (2006.01) |
| *B23P 19/04* | (2006.01) |
| *E04H 1/12* | (2006.01) |

(52) U.S. Cl.
CPC .............. *B23P 19/04* (2013.01); *E04H 1/1238* (2013.01); *E04H 2001/1283* (2013.01); *Y02B 10/30* (2013.01); *Y10T 29/49826* (2015.01)

(58) Field of Classification Search
CPC ................ B23P 19/04; E04H 1/1238; E04H 2001/1283; Y02B 10/30; Y10T 29/49826
USPC ............ 60/641.8, 698; 290/1 R, 1 A, 44, 55; 52/79.1, 220.1; 361/601
See application file for complete search history.

(56) References Cited

U.S. PATENT DOCUMENTS

| | | | | |
|---|---|---|---|---|
| 4,136,432 | A  * | 1/1979 | Melley, Jr. ...................... | 29/469 |
| 6,393,775 | B1 * | 5/2002 | Staschik ........................ | 52/79.1 |
| 7,081,682 | B2 * | 7/2006 | Campion ...................... | 290/1 A |
| 7,150,153 | B2 * | 12/2006 | Browe .......................... | 60/641.1 |
| 7,230,819 | B2 * | 6/2007 | Muchow et al. .............. | 361/601 |
| 7,288,192 | B2 * | 10/2007 | Jowett ............................ | 210/220 |
| 7,615,876 | B2 * | 11/2009 | Marshall ....................... | 290/1 A |
| 8,593,102 | B2 * | 11/2013 | McGuire et al. .............. | 320/101 |
| 2006/0260672 | A1* | 11/2006 | Niederer ....................... | 136/251 |

* cited by examiner

*Primary Examiner* — Hoang Nguyen
(74) *Attorney, Agent, or Firm* — Law Office of Mark Brown, LLC; Mark E. Brown; Christopher M. DeBacker

(57) ABSTRACT

A transportable, deployable power system comprising a hybrid power box containing solar panels, wind turbine(s), fuel cells, fuel reformers, and other energy sources. The system could also include waste water and potable water inlet and outlet ports for water treatment. It will also allow for shelf mounted solar and wind turbine installation for disaster recovery, backup power for telecommunication, military power, Homeland Security power, off grid homes and water and wastewater packaging domestically and internationally. The present invention is ideal for any situation requiring immediate power and/or water treatment, such as remote construction sites or in emergency situations. The hybrid power box can be mounted to a standard shipping truck, train, or ship, and transported over land to the desired location.

20 Claims, 6 Drawing Sheets

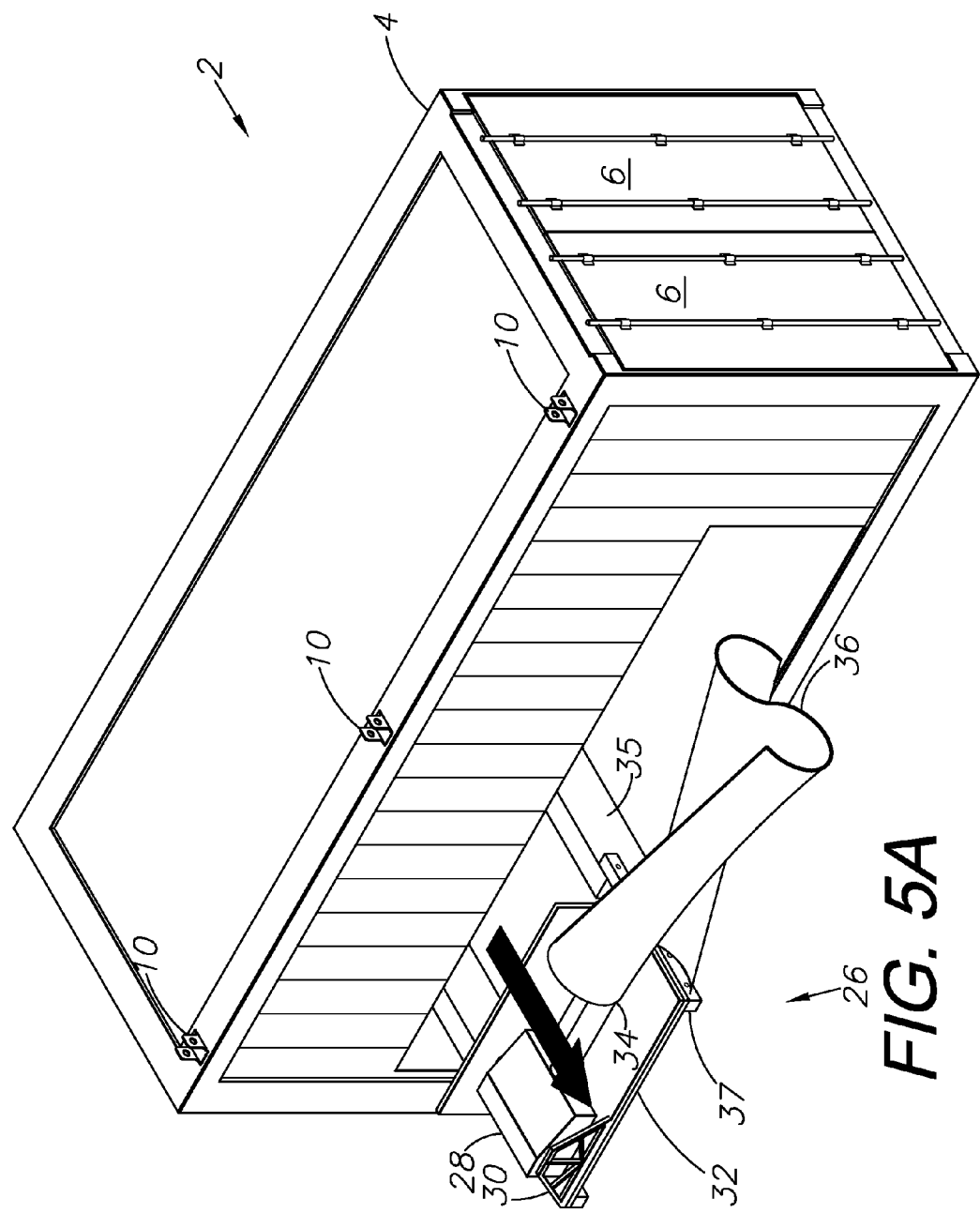

TRANSPORTABLE HYBRID POWER SYSTEM

CROSS-REFERENCE TO RELATED APPLICATIONS

This application claims priority in U.S. Provisional Patent Application No. 61/600,094, filed Feb. 17, 2012, which is incorporated herein by reference.

BACKGROUND OF THE INVENTION

1. Field of the Invention

The present invention relates generally to transportable, deployable renewable energy power boxes, and more specifically, to a power box for use in remote locations and emergency situations to provide renewable power and other temporary or semi-permanent services.

2. Description of the Related Art

During emergency relief situations, military deployment situations, on construction sites, and in remote locations far from population centers, the problem of power and water treatment looms large. Often people rely on gasoline powered generators to provide temporary power, but this is an extremely inefficient method.

Small portable solar-powered systems have been created for charging portable electronic devices, such as laptop computers and cellular phones, but existing system have limited use.

What is needed is a way to transport a means for generating a large amount of electrical power and/or water treatment solutions at an isolated location quickly.

Heretofore there has not been available a deployable hybrid power box with the advantages and features of the present invention.

BRIEF SUMMARY OF THE INVENTION

The present invention relates to a transportable, deployable system comprising a hybrid power box containing solar panels, wind turbine(s), fuel cells, fuel reformers, and other energy sources. The system could also include waste water and potable water inlet and outlet ports for water treatment. It will also allow for shelf-mounted solar and wind turbine installation for disaster recovery, backup power for telecommunication, military power, Homeland Security power, off grid homes and water and wastewater packaging domestically and internationally.

In use, the invention is placed at a remote location, at the site of an emergency, or may alternatively be used as a backup power source for an otherwise powered location.

The power box may contain a variety of energy-producing means in a variety of combinations. An exemplary embodiment will include a wind turbine, a solar panel array, and a number of fuel cells or fuel reformers. The box can be placed at a localized site where power is needed, and the various energy-creating devices can be deployed. The box may contain a number of rechargeable batteries for storing power generated in excess to power being used.

A box may also contain a means for the treatment of waste water or potable drinking water. The box may contain a water storage tank, similar to modern recreational vehicles, or it may have a way to purify water input into the system. The box may store waste water in a similar container, or may actually process the wastewater internally and output treated water.

BRIEF DESCRIPTION OF THE DRAWINGS

The drawings constitute a part of this specification and include exemplary embodiments of the present invention illustrating various objects and features thereof.

FIG. 5A is an isometric view of an embodiment of the present invention demonstrating a wind turbine being ejected from the main body.

DETAILED DESCRIPTION OF THE PREFERRED EMBODIMENTS

I. Introduction and Environment

As required, detailed aspects of the present invention are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

The present invention solves issues with the remote commissioning of power generation by completing and testing the complete renewable energy system in a single transportable package. That package can be shipped to a job site or remote location for immediate power production and/or water treatment.

The present invention features a transportable power box system 2 comprising generally a transport container 4 containing a plurality of power generation elements and water treatment elements for use in specific situations and locations, including emergency response situations, isolated off-grid locations, construction sites, military zones, and third-world countries. A preferred embodiment occupies a standard ISO shipping container with dimensions of 8 feet by 10 feet by 20 feet, or 8 feet by 10 feet by 40 feet. Sizes may vary though, depending on what components are necessary for a particular box. Ideally, renewable energy sources such as solar and wind power are used; however, gas-powered generators or other power sources can be included for additional power production.

II. Preferred Embodiment or Aspect Transportable Hybrid Power System 2

The embodiments discussed herein are merely illustrative of specific manners in which to make and use the invention and are not to be interpreted as limiting the scope of the instant invention.

Figure 1:
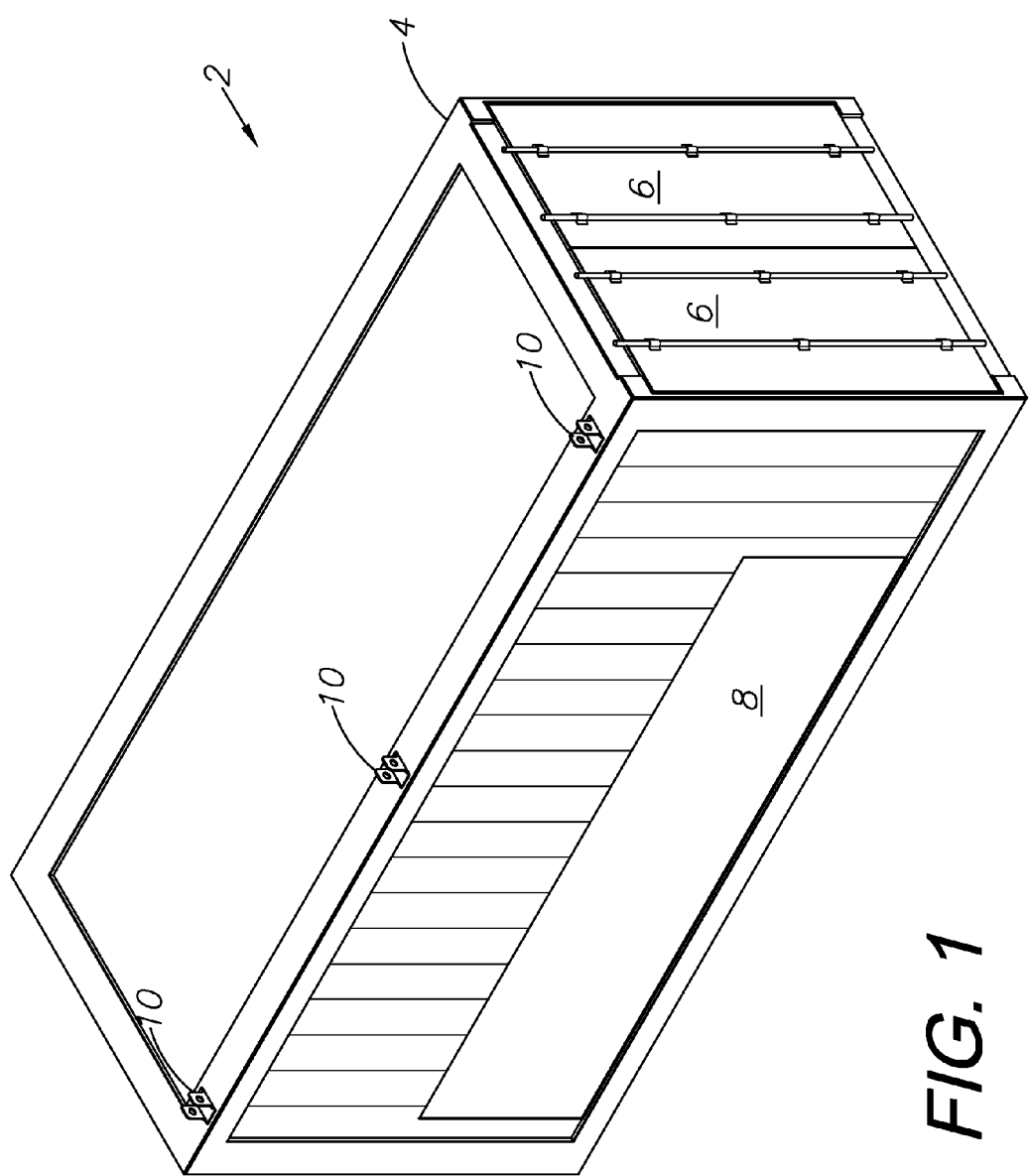
FIG. 1 is an isometric view of an embodiment of the present invention.

Referring to the drawings in detail, FIG. 1 illustrates a perspective view of a hybrid power system 2 taken from one corner. The system primarily includes a transport container box 4, typically an ISO shipping container. A pair of doors 6 are hingedly mounted to one side of the box 4. These doors could alternatively be a rolling vertical door, or any other type of common opening. These doors provide access to the internal components stored within the box 4.

A wind turbine access window 8 is shown in a close position. This window panel is cut into a side of the box 4, and allows the wind turbine power generation sub-system 26 to be ejected from within the box 4.

Figure 2:
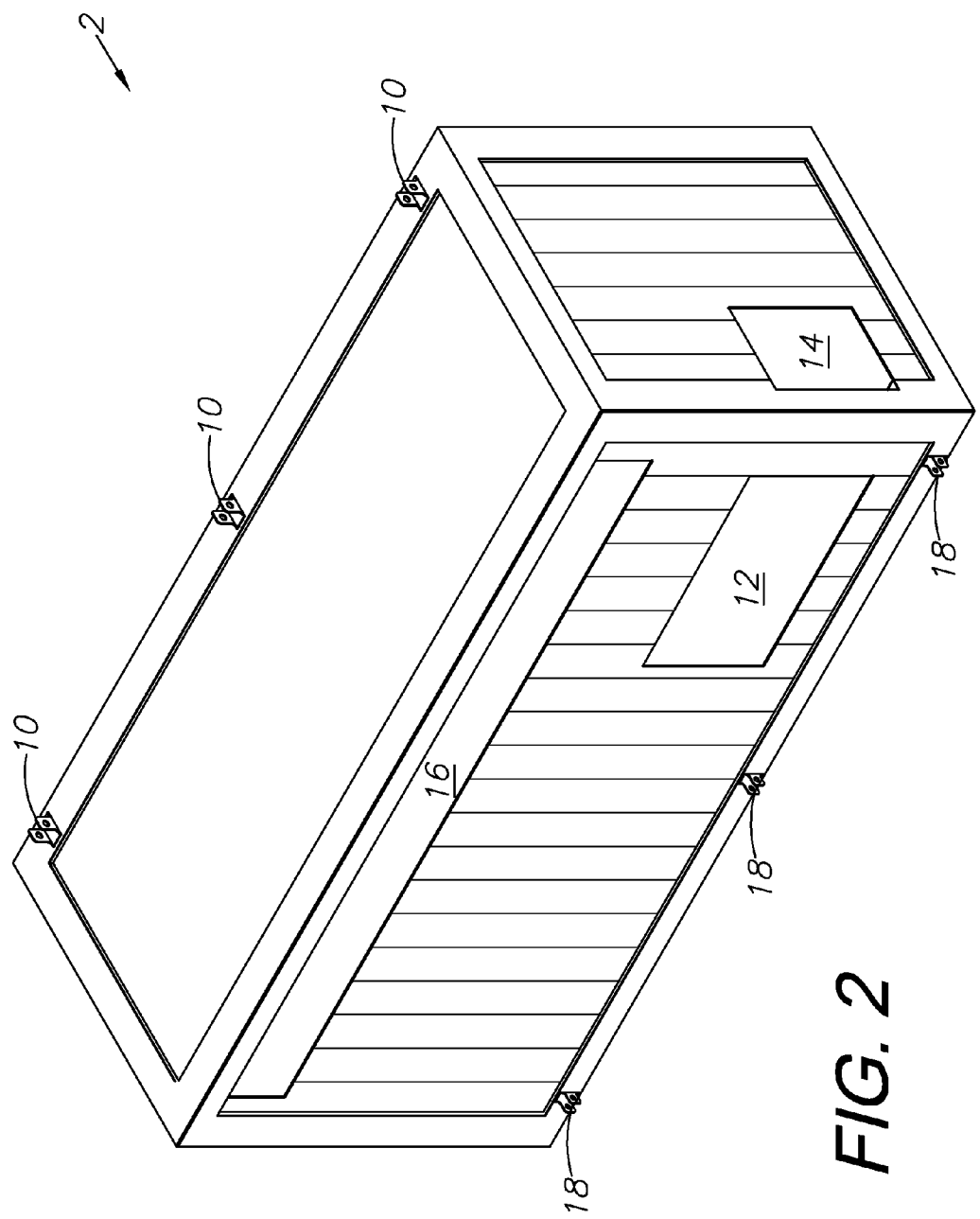
FIG. 2 is an isometric view of the same, as viewed from the opposite corner.

As shown more clearly in FIG. 2, a number of roof brackets 10 and side brackets 18 may be mounted to the exterior of the box 4 for use in anchoring the solar panel array 20 for optimal alignment.

FIG. 2, shown from the opposite corner as FIG. 1, shows a side window 12 and rear window 14 which allow access to power generation elements within the box 4, including a fuel cell power sub-system 42. Another window 16 allows the solar panel array 20 to extend out from within the confines of the box 4.

Figure 3:
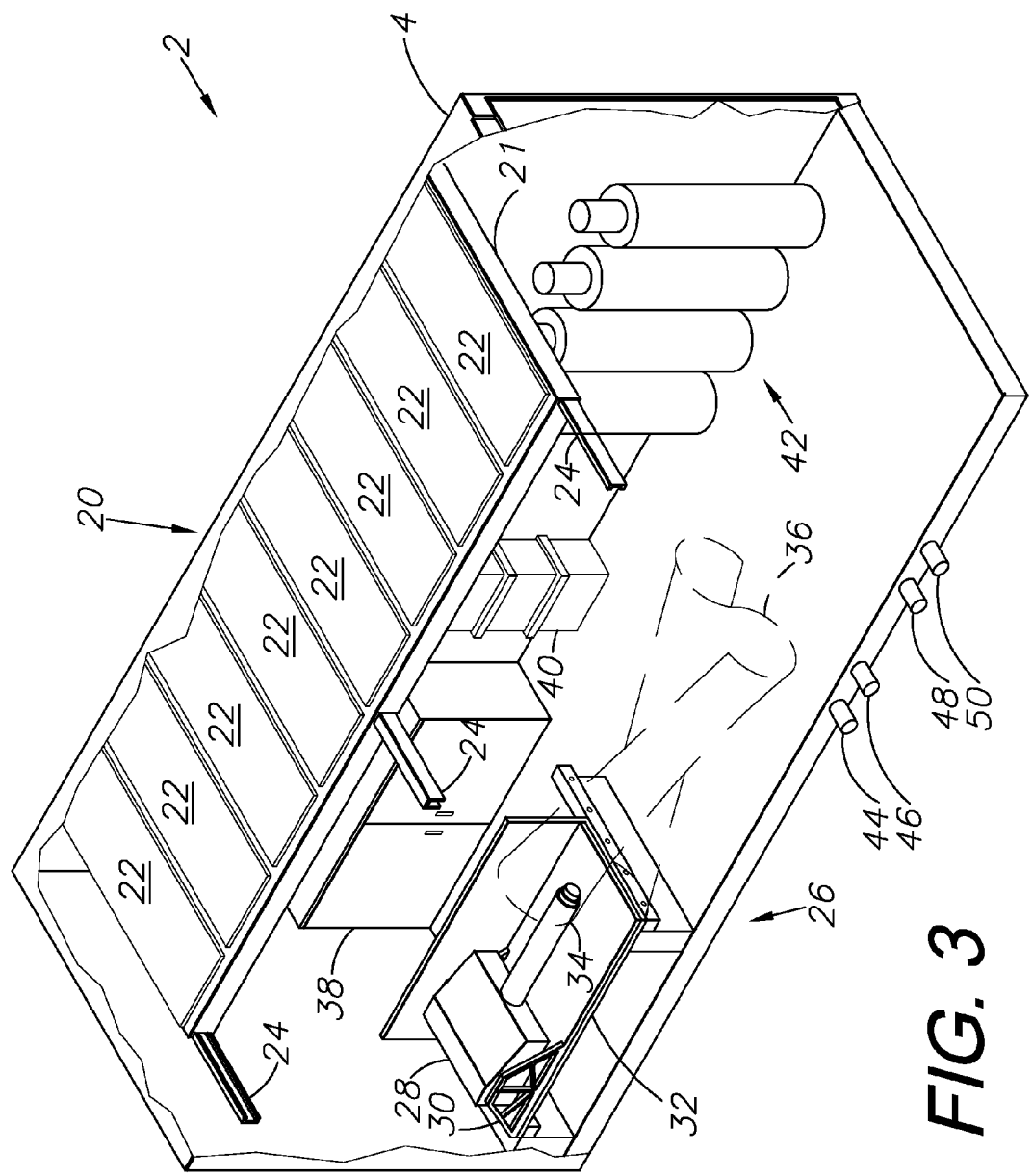
FIG. 3 is an isometric view of an embodiment of the present invention displaying the internal components through a cutaway.

FIG. 3 provides a view to the interior of the box 4, including a variety of power generating elements and other elements for use with the transportable power system 2. The embodiment displayed in FIG. 3 includes a wind turbine power sub-system 26, a solar panel array 20, a fuel cell power sub-system 42, a storage closet 38, and a number of batteries 40 for storing power generated by the various power generating sub-systems.

Figure 5B:
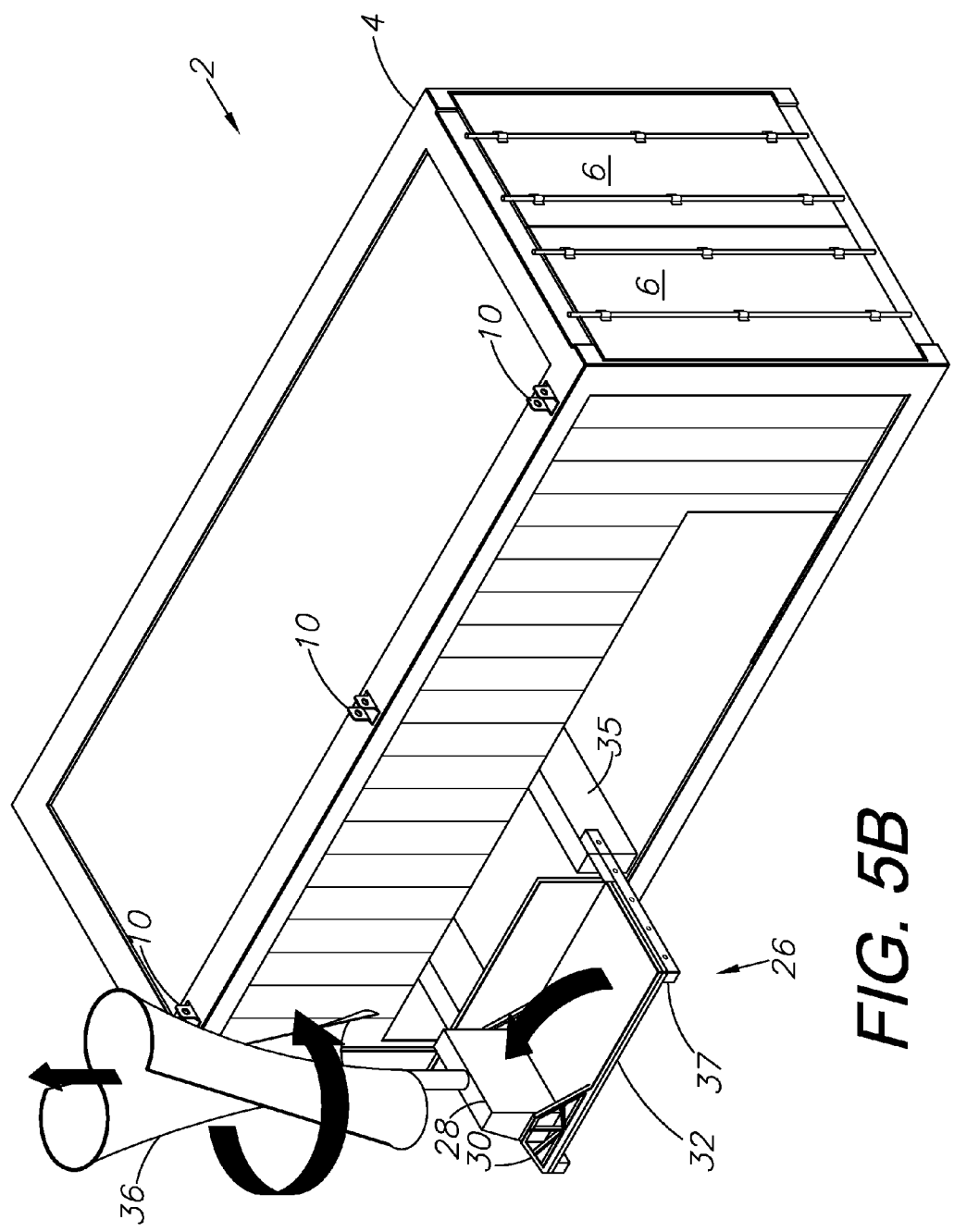
FIG. 5B is an isometric view of the same, showing the wind turbine being rotated and lifted into a final position.

An exemplary wind turbine sub-system includes a turbine base 28 hingedly mounted to a slide base 32 via a pair of mounting rails 30. A hydraulic extension arm 34 is affixed to the turbine base to raise and lower the wind turbine sail 36. As shown in more detail in FIGS. 5A and 5B, the wind turbine power sub-system 26 slides through the space left by window panel 8 when that panel is opened or removed. The wind sub-system slides out from the box 4 on a pair of rails 37 which are connected to a rail base 35 attached to the floor of the box. Once the wind sub-system slides out, as shown in FIG. 5A, the turbine base 28 can be rotated 90 degrees, as shown in FIG. 5B, and the wind sail 36 can be raised into the air to generate clean electricity from the wind.

Figure 4:
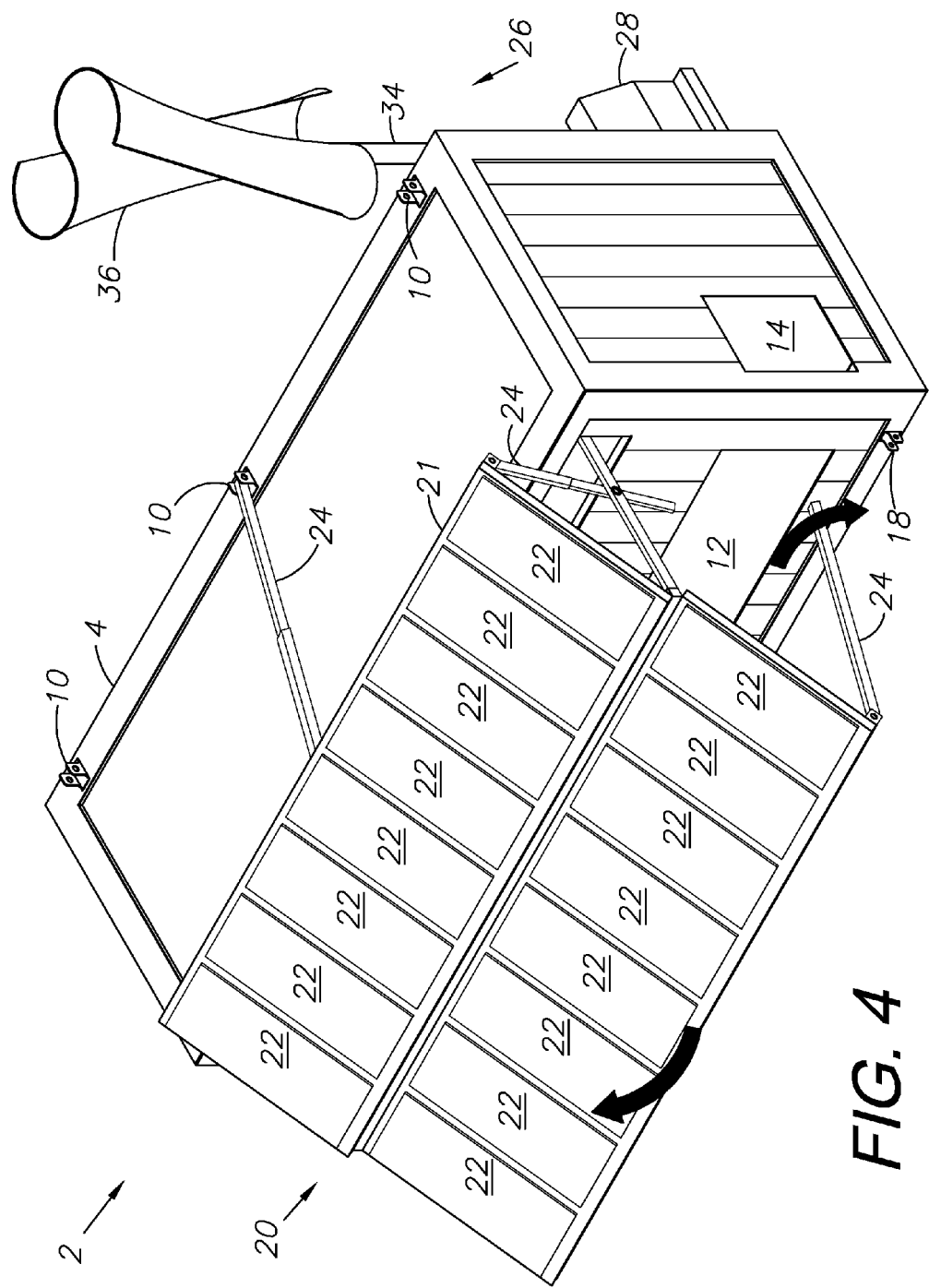
FIG. 4 is an isometric view of an embodiment of the present invention demonstrating the internal components being deployed.

As shown in FIG. 4, an exemplary solar panel array 20 includes a plurality of solar panels 22 mounted onto a solar panel frame 21. An embodiment of such an array may include multiple sets of panels which are folded on top of one another when stored, as shown in FIG. 3, but which are hingedly connected and may be extended for additional solar collection as shown in FIG. 4. In an embodiment of the present invention, the solar array 20 includes a number of frame members 24 which connect to roof brackets 10 and side brackets 18 for securing the array when it is in use.

An embodiment of the present invention may also include a water treatment sub-system. As shown in FIG. 3, potable water inlet 44 and outlet 46 ports would allow for water to be added to a storage tank (not shown) within the box 4, or into a water treatment device (not shown) where the water is treated and then stored. The water may then be used as drinking water.

Similarly, a wastewater inlet 48 and outlet 50 port could allow for the storage and draining and/or treatment of waste water. This could be especially effective in an emergency situation where waste water is a health concern.

Because the entire system is contained within a standard shipping container, the system can be delivered to a remote location via transport truck, railcar, or shipping barge. Smaller systems stored in smaller boxes can be delivered in the backs of standard commercial pick-up trucks or on trailers.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A transportable power supply system comprising:
   a container enclosing an interior space;
   a plurality of power sources selected from the group consisting of a wind turbine, a solar panel array, a hydrogen fuel cell, a fuel reformer, a battery, a gasoline generator, and a diesel generator;
   wherein said container interior space is configured to contain said selected plurality of power sources;
   wherein said container is selectively deployable such that said selected plurality of power sources generate power at a deployed location;
   said wind turbine further comprising a hydraulic extension arm including a proximal end and a distal end, a wind sail mounted to the distal end of said extension arm, and a turbine base mounted to the proximal end of said extension arm;
   a shelf configured for sliding into and out of said container;
   said turbine base being hingedly affixed to said shelf; and
   said turbine base being configured for rotation 90 degrees from a generally horizontal orientation to a generally vertical orientation after said shelf is slid out from said container.

2. The system of claim 1, further comprising:
   said container including a roof, a floor, two side walls, a front wall, and a rear access door, said container side walls and front wall including a plurality of panels configured for opening and closing.

3. The system of claim 2, further comprising:
   said container comprising a standard ISO shipping container configured for transport on shipping trucks, shipping trains, and shipping barges.

4. The system of claim 1, further comprising:
   said solar panel array including a plurality of mounting rods;
   said container including a plurality of mounting brackets configured for receiving said solar panel array mounting rods; and
   said mounting rods configured to be positioned such that said solar panel array is aligned with an advantageous sun angle.

5. The system of claim 1, further comprising:
   said solar panel array including a first section and a second section, wherein said first and second sections are hingedly connected; and
   said solar panel array further configured for said first section to be folded against said second section.

6. The system of claim 1, further comprising:
   a potable water storage tank;
   a potable water inlet port; and
   a potable water outlet port.

7. The system of claim 6, further comprising a water purification system.

8. The system of claim 1, further comprising:
a waste water storage tank;
a waste water inlet port; and
a waste water outlet port.

9. The system of claim 8, further comprising a waste water treatment system.

10. The system of claim 1, wherein said battery is configured for receiving and storing power generated by said selected plurality of power sources.

11. A transportable power supply system comprising:
a container enclosing an interior space, said container including a roof, a floor, two side walls, a front wall, and a rear access door, said container side walls and front wall including a plurality of panels adapted for opening and closing;
a plurality of power sources selected from the group including at least a wind turbine, and a solar panel array;
wherein said container interior space is adapted to contain said selected plurality of power sources;
wherein said container is selectively deployable such that said selected plurality of power sources generate power at a deployed location;
a plurality of batteries adapted for storing power created by said plurality of power sources;
said solar panel array including a first section and a second section, wherein said first and second sections are hingedly connected, and said solar panel array further adapted for said first section to be folded against said second section;
said wind turbine further comprising a hydraulic extension arm including a proximal end and a distal end, a wind sail mounted to the distal end of said extension arm, and a turbine base mounted to the proximal end of said extension arm;
a shelf adapted for sliding into and out of said container;
said turbine base being hingedly affixed to said shelf;
said turbine base adapted to rotate 90 degrees from a generally horizontal orientation to a generally vertical orientation after said shelf is slid out from said container; and
a water treatment subsystem including a potable water storage tank, a potable water inlet port, a potable water outlet port, a waste water storage tank, a waste water inlet port, and a waste water outlet port.

12. The system of claim 11, further comprising:
said container comprising a standard ISO shipping container adapted for transport on shipping trucks, shipping trains, and shipping barges.

13. A method of generating power at a selected location, the method comprising the steps:
providing a container enclosing an interior space;
providing a plurality of power sources selected from the group consisting of a wind turbine, a solar panel array, a hydrogen fuel cell, a fuel reformer, a battery, a gasoline generator, and a diesel generator;
installing said selected plurality of power sources within said container interior space;
transporting said container to the selected location;
deploying said selected plurality of power sources;
generating electrical power via said selected plurality of power sources;
providing said wind turbine with a hydraulic extension arm including a proximal end and a distal end;
mounting a wind sail to the distal end of said extension arm;
mounting a turbine base to the proximal end of said extension arm;
providing a sliding shelf;
hingedly affixing said turbine base to said shelf;
sliding said shelf from the interior space of said container to a space exterior to said container;
rotating said turbine base 90 degrees from a generally horizontal orientation to a generally vertical orientation; and
extending said hydraulic extension arm such that said wind sail is raised a vertical distance.

14. The method of claim 13, further comprising the steps:
providing a potable water storage tank;
providing a potable water inlet port;
providing a potable water outlet port;
storing potable water in said potable water storage tank via said potable water inlet port; and
dispensing potable water from said potable water storage tank via said potable water outlet port.

15. The method of claim 14, further comprising the steps:
providing a water purification system;
purifying water input into said potable water inlet port; and
storing said purified water in said potable water storage tank.

16. The method of claim 13, further comprising the steps:
providing a waste water storage tank;
providing a waste water inlet port;
providing a waste water outlet port;
storing waste water in said waste water storage tank via said waste water inlet port; and
dispensing waste water from said waste water storage tank via said waste water outlet port at a location designated for waste water dumping.

17. The method of claim 16, further comprising the steps:
providing a waste water treatment system; and
treating waste water stored within said waste water storage tank.

18. A transportable power supply system comprising:
a container enclosing an interior space, said container including a roof, a floor, two side walls, a front wall, and a rear access door, said container side walls and front wall including a plurality of panels adapted for opening and closing;
a plurality of power sources selected from the group including at least a wind turbine, and a solar panel array;
wherein said container interior space is adapted to contain said selected plurality of power sources;
wherein said container is selectively deployable such that said selected plurality of power sources generate power at a deployed location;
a plurality of batteries adapted for storing power created by said plurality of power sources;
said solar panel array including a first section and a second section, wherein said first and second sections are hingedly connected, and said solar panel array further adapted for said first section to be folded against said second section;
said wind turbine further comprising a hydraulic extension arm including a proximal end and a distal end, a wind sail mounted to the distal end of said extension arm, and a turbine base mounted to the proximal end of said extension arm;
a shelf movably mounted on said container and configured for movement between storage and use positions respectively inside and outside said container;
said turbine base being hingedly affixed to said shelf;

said turbine base adapted to rotate 90 degrees from a generally horizontal orientation to a generally vertical orientation after said shelf is slid out from said container; and a water treatment subsystem including a potable water storage tank, a potable water inlet port, a potable water outlet port, a waste water storage tank, a waste water inlet port, and a waste water outlet port.

19. The system of claim 18, further comprising:

said wind turbine further comprising a hydraulic extension arm including a proximal end and a distal end, a wind sail mounted to the distal end of said extension arm, and a turbine base mounted to the proximal end of said extension arm.

20. The system of claim 19, further comprising:

a shelf configured for sliding into and out of said container;

said turbine base being hingedly affixed to said shelf; and said turbine base configured for rotation 90 degrees from a generally horizontal orientation to a generally vertical orientation after said shelf is slid out from said container.

* * * * *